United States Patent
Harel et al.

(10) Patent No.: US 7,633,905 B1
(45) Date of Patent: Dec. 15, 2009

(54) CALIBRATING A TRANSMIT DIVERSITY COMMUNICATION DEVICE

(75) Inventors: Haim Harel, New York, NY (US); Yair Karmi, Bridgewater, NJ (US); Phil Fu-Wei Chen, Denville, NJ (US); Kenneth A. Kludt, Bedminster, NJ (US)

(73) Assignee: Magnolia Broadband Inc., Bedminster, NJ (US)

( * ) Notice: Subject to any disclaimer, the term of this patent is extended or adjusted under 35 U.S.C. 154(b) by 744 days.

(21) Appl. No.: 11/283,250

(22) Filed: Nov. 18, 2005

Related U.S. Application Data

(60) Provisional application No. 60/713,976, filed on Sep. 2, 2005.

(51) Int. Cl.
*H04Q 7/00* (2006.01)
(52) U.S. Cl. ...................................... 370/334
(58) Field of Classification Search ........................ None
See application file for complete search history.

(56) References Cited

U.S. PATENT DOCUMENTS

| | | | |
|---|---|---|---|
| 5,546,090 A * | 8/1996 | Roy et al. ................... | 342/174 |
| 5,642,353 A | 6/1997 | Roy, III et al. | |
| 5,832,044 A | 11/1998 | Sousa et al. | |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,480,153 B1 * | 11/2002 | Jung et al. ................... | 342/368 |
| 6,492,942 B1 | 12/2002 | Kezys | |
| 6,615,024 B1 * | 9/2003 | Boros et al. ............... | 455/67.14 |
| 6,636,495 B1 | 10/2003 | Tangemann | |
| 6,690,952 B2 * | 2/2004 | Nishimori et al. ........ | 455/562.1 |
| 6,704,370 B1 | 3/2004 | Chheda et al. | |

(Continued)

FOREIGN PATENT DOCUMENTS

EP 0 986 193 3/2000

(Continued)

OTHER PUBLICATIONS

Nishimori et al, Automatic Calibration Method Using Transmitting Signals of an Adaptive Array for TDD Systems, IEEE, 5 pages, Nov. 2001.*

(Continued)

*Primary Examiner*—Frank Duong
(74) *Attorney, Agent, or Firm*—Pearl Cohen Zedek Latzer, LLP

(57) ABSTRACT

Calibrating a transmit diversity device includes establishing diversity parameter values of diversity parameters for a plurality of signals, where each signal is transmitted from a channel of the transmit diversity device. The following are performed for each diversity parameter value to yield associations: determining a modification parameter value that yields a diversity parameter value, where a modification parameter value describes modulation of a feature of at least one signal; and associating the modification parameter value with the diversity parameter value to yield an association. Calibration data is generated in accordance with the associations.

18 Claims, 1 Drawing Sheet

U.S. PATENT DOCUMENTS

| | | | |
|---|---|---|---|
| 6,745,009 | B2 | 6/2004 | Raghothaman |
| 6,762,717 | B2* | 7/2004 | Hirabe ................ 342/368 |
| 6,810,264 | B1 | 10/2004 | Park et al. |
| 6,859,643 | B1 | 2/2005 | Ma et al. |
| 6,882,228 | B2 | 4/2005 | Rofougaran |
| 6,917,786 | B1* | 7/2005 | Mizuguchi ............ 455/67.14 |
| 7,027,523 | B2* | 4/2006 | Jalali et al. ............ 375/296 |
| 7,197,282 | B2 | 3/2007 | Dent et al. |
| 7,200,368 | B1* | 4/2007 | Hottinen et al. ............ 455/101 |
| 7,340,248 | B2* | 3/2008 | Kawasaki et al. .......... 455/423 |
| 7,392,015 | B1* | 6/2008 | Farlow et al. ............ 455/67.11 |
| 2003/0112880 | A1 | 6/2003 | Walton et al. |
| 2004/0048584 | A1 | 3/2004 | Vaidyanathan et al. |
| 2004/0085239 | A1 | 5/2004 | Ukena et al. |
| 2005/0059355 | A1 | 3/2005 | Liu |
| 2005/0143113 | A1 | 6/2005 | Lee et al. |
| 2006/0160496 | A1 | 7/2006 | Murakami et al. |
| 2007/0189151 | A1 | 8/2007 | Pan et al. |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

Strickler, Walt, "*Saving Time and Money on Mobile Phone Production Testing*", Keithley Instruments, Inc., No. 2536, www.keithley.com, 2 pages, Jul. 2004.

"*Application Note 3434, RF Power Reduction for CDMA/W-CDMA Cellular Phones*," Maxim/Dallas, http://www.maxim-ic.com/appnotes.cfm/appnote_number/3434, 4 pages, Dec. 15, 2004.

"*NIMS: Networked Infomechanical Systems*", Center for Embedded Networked Sensing, http://research.cens.ucla.edu/portal/nims, 10 pages, Printed Nov. 14, 2005.

Brandle, George, "*New Testing Requirements for cdma2000 Mobile Phones*", Evaluation Engineering, http://www.evaluationengineering.com/archive/articles/0601wire.htm, 9 pages, Printed Nov. 14, 2005.

"*Model 2800 RF Power Analyzer*", Keithley Instruments, Inc., http://www.globalspec.com/FeaturedProducts/Detail/KeithleyInstruments/Model_2800_R, 3 pages, Printed Nov. 14, 2005.

Non-final Office Action for U.S. Appl. No. 11/424,257 mailed Jun. 10, 2009.

* cited by examiner

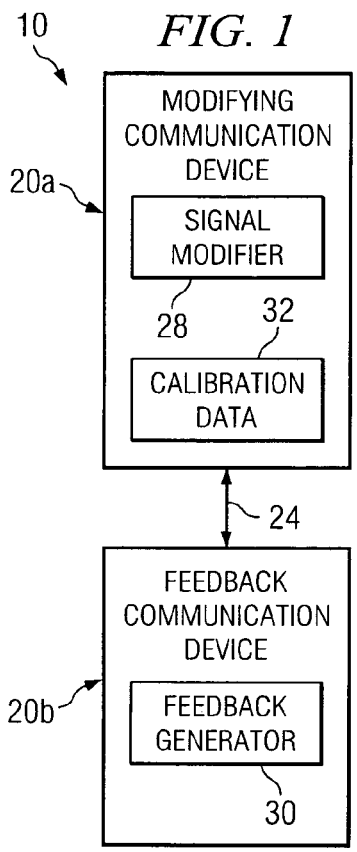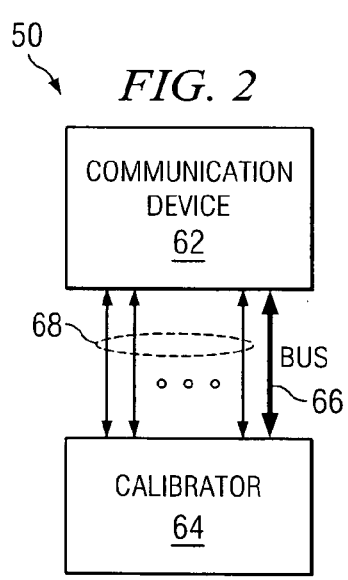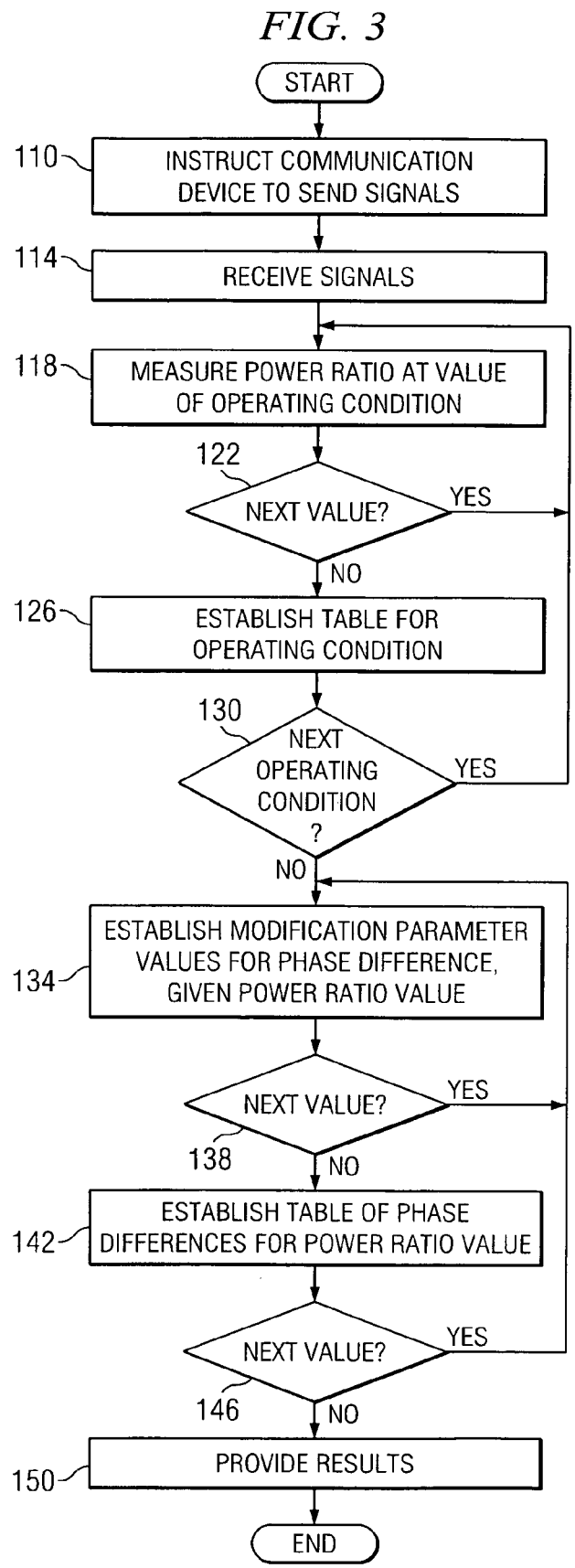

CALIBRATING A TRANSMIT DIVERSITY COMMUNICATION DEVICE

RELATED APPLICATION

This application claims benefit under 35 U.S.C. § 119(e) of U.S. Provisional Application Ser. No. 60/713,976, entitled "CALIBRATION OF UNITS IN TRANSMIT DIVERSITY SYSTEM," filed Sep. 2, 2005, by Yair (nmi) Karmi.

TECHNICAL FIELD

This invention relates generally to the field of multi-channel communication and more specifically to calibrating a transmit diversity communication device.

BACKGROUND

A transmitting communication device may have multiple antenna elements that transmit signals to communicate information. A receiving communication device extracts the information from the transmitted signals. Multiple antenna elements may enhance spectral efficiency, allowing for more users to be simultaneously served over a given frequency band. The transmitted signals, however, propagate along different paths and may reach the receiving communication device with different phases that destructively interfere. It is generally desirable to reduce interference of transmitted signals.

SUMMARY OF THE DISCLOSURE

In accordance with the present invention, disadvantages and problems associated with previous techniques for calibrating a transmit communication device may be reduced or eliminated.

According to one embodiment of the present invention, calibrating a transmit diversity device includes establishing diversity parameter values of diversity parameters for a plurality of signals, where each signal is transmitted from a channel of the transmit diversity device. The following are performed for each diversity parameter value to yield associations: determining a modification parameter value that yields a diversity parameter value, where a modification parameter value describes modulation of a feature of at least one signal; and associating the modification parameter value with the diversity parameter value to yield an association. Calibration data is generated in accordance with the associations.

Certain embodiments of the invention may provide one or more technical advantages. A technical advantage of one embodiment may be that a calibration process may be performed on a transmit diversity device to determine calibration data. The calibration data may be used to establish modification parameter values that yield specific diversity parameter values under actual operating conditions.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of a communication network that includes a modifying communication device that may be calibrated;

FIG. 2 is a block diagram illustrating one embodiment of a system that includes a calibrator operable to perform a calibration process; and FIG. 3 is a flowchart illustrating one embodiment of a method for performing a calibration process that may be used by the calibrator of FIG. 2.

DETAILED DESCRIPTION OF THE DRAWINGS

Embodiments of the present invention and its advantages are best understood by referring to FIGS. 1 through 3 of the drawings, like numerals being used for like and corresponding parts of the various drawings.

FIG. 1 is a block diagram illustrating one embodiment of a communication network 10 that includes a modifying communication device 20a that may be calibrated according to a calibration process. According to the embodiment, modifying communication device 20a applies a diversity parameter adjustment to signals, and transmits the signals to feedback communication device 20b through multiple antenna elements. Modifying communication device 20a determines a next diversity parameter adjustment in accordance with the feedback information that describes the signals as received by feedback communication device 20b. According to the embodiment, a calibration process may be performed to establish calibration data that may be used to calibrate modifying communication device 20a.

According to the illustrated embodiment, network 10 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as the Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 10 may utilize communication protocols and technologies to provide the communication sessions. Example communication protocols and technologies include those set by the Institute of Electrical and Electronics Engineers, Inc. (IEEE) 802.xx, International Telecommunications Union (ITU-T) standards, European Telecommunications Standards Institute (ETSI) standards, Internet Engineering Task Force (IETF) standards, or other standards.

Devices of network 10 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

Network 10 may comprise any suitable communication network. A communication network may comprise all or a portion of a public switched telephone network (PSTN), a public or private data network, a local area network (LAN), a metropolitan area network (MAN), a wide area network (WAN), a wireline or wireless network, a local, regional, or global communication network (such as the Internet), an enterprise intranet, other suitable communication link, or any combination of the preceding.

Network 10 includes one or more modifying communication devices 20a and one or more feedback communication devices 20b that communicate via a link 24. A communication device 20 represents any device operable to communicate information via signals with one or more other communication devices 20. For example, communication device 20 may comprise a subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP) or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

Link 24 between communication devices 20a and 20b may include any suitable path operable to communicate one or more channels of signals. Link 24 may comprise a wireless radio frequency (RF) link or a wired link.

Modifying communication device 20a may comprise a transmit diversity communication device. A transmit diversity communication device may include one or more antenna elements associated with one or more channels. An antenna element is operable to receive, transmit, or both receive and transmit a signal over a channel. Multiple antenna elements may provide for a separation process known as spatial filtering. Typically, at least two channels are simultaneously active in at least one mode of operation.

Modifying communication device 20a includes a signal modifier 28 that modifies one or more signals in accordance with feedback information received from feedback communication device 20b. The modification may increase constructive interference or reduce destructive interference. According to one embodiment, signal modifier 28 may modify baseband signals prior to conversion to RF signals.

According to another embodiment, signal modifier 28 may modify RF signals after conversion from baseband signals.

According to one embodiment, signal modifier 28 modifies the signals according to one or more modification parameter values to adjust one or more diversity parameter values. A modification parameter may refer to a feature of signals that may be modulated prior to transmission, and a diversity parameter may refer to a feature describing the signals transmitted after modulation, such as when received by feedback communication device 20b.

Signal features may include absolute or relative signal features. Absolute signal features describe a signal with respect to an independent measure, and may include, for example, phase, amplitude, power, frequency, timing, other suitable signal feature, or any combination of the preceding. For example, an absolute signal feature may describe the total power transmitted by modifying communication device 20a.

Relative signal features describe a first signal from a first channel with respect to a second signal from a second channel, and may include, for example, relative power or relative phase. Relative power may refer to a power ratio between the power of the first signal and the power of the second signal, and may be expressed in decibels by the following equation:

$$R_{12}[db]=10*\log 10(|P_1/P_2|)$$

where $R_{12}$ represents the power ratio, $P_1$ represents the power of the first signal, and $P_2$ represents the power of the second signal.

Relative phase may refer to the phase difference between the phase of the first signal and the phase of the second signal, and may be expressed by the following equation:

$$\Delta\Phi=\Phi_1-\Phi_2$$

where $\Delta\Phi$ represents the phase difference, $\Phi_1$ represents the phase of the first signal, and $\Phi_1$ represents the phase of the second signal.

According to one embodiment, signal modifier 28 may calculate a diversity parameter adjustment from feedback information according to a diversity control technique. According to the technique, the diversity parameter adjustment may be calculated from a previous diversity parameter adjustment and a diversity parameter increment, where the diversity parameter increment is determined using feedback information.

Feedback information may be obtained in any suitable manner. According to a first example technique, signal modifier 28 obtains feedback information from a quality indication signal received from feedback communication device 20b. A quality indication signal may refer to a signal that describes a quality of the signal as received by feedback communication device 20b. For example, a quality indication signal may indicate, whether modifying communication device 20a should increase or reduce transmission power.

According to a second example technique, signal modifier 28 obtains feedback information from a control signal generated by a baseband subsystem of modifying communication device 20a. A control signal may refer to a signal that provides instructions to a component of a communication device. According to the embodiment, the baseband subsystem extracts feedback information from a quality indication signal from feedback communication device 20b, and generates a control signal that reflects the feedback information. For example, the control signal may provide instructions on whether to increase or reduce transmission power in accordance with the feedback information.

The operating conditions of modifying communication device 20a may affect the diversity parameter adjustment, which in turn may affect the diversity parameter values of the signals received at feedback communication device 20b. Operating conditions may refer to any aspect of operation of modification communication device 20a, and may be represented by values of condition parameters, such as temperature, channel frequency, other condition, or other suitable combination of the preceding.

Signal modifier 28 includes calibration data 32 that describes modification parameter values that yield specific diversity parameter values, and may take into account the operating conditions of modifying communication device 20a. Calibration data 32 may include diversity parameter data that associates diversity parameter values with modification parameter values that yield the diversity parameter values.

The associations may take into account the operating conditions, and specific associations may be defined for specific conditions. Calibration data 32 may include adjustment data that specifies adjustments to modification parameter values. The adjustments may take into account the operating conditions, and specific adjustments may be defined for specific conditions.

Calibration data 32 may be organized in any suitable manner. According to one embodiment, tables may be used to organize the data. For example, different tables may be used for different diversity parameters, or different tables may be used for different operating conditions. Data from one or more tables may be used to calculate a diversity parameter adjustment, and data from multiple tables may be combined in any suitable manner for the calculation.

According to one embodiment, diversity parameter data may specify modification parameter values for absolute transmit power and relative phase. Diversity parameter data may specify the channel power for each channel that yields a particular total transmit power. Channel power may refer to the power transmitted by an antenna element of a channel. The absolute transmit power may refer to the total power transmitted by the active antenna elements, and may be selected in accordance with an air interface standard. As an example, diversity parameter data may specify that the channel power for each channel is P/n, where P represents the absolute transmit power, and n represents the number of active channels.

According to the embodiment, diversity parameter data may specify modification parameter values that yield certain particular phase difference values, given particular power ratio values. As an example, a table i for a power ratio value R(i) may provide modification parameter values that yield phase difference values $\Delta\Phi(i,j)$, where $\Delta\Phi(i,j)$ ranges from 0 to 360 degrees. Different tables may include modification parameter values for the same or different diversity parameter values. According to one embodiment, different tables may apply to different operating conditions, for example, different tables may apply for different frequencies and temperatures.

According to one embodiment, adjustment data may specify adjustments to account for power ratio changes in response to operating conditions. According to the embodiment, a temperature table specifies adjustments for temperature variations, and a frequency table specifies adjustments for frequency variations. Data from the tables may be combined in any suitable manner, for example, an adjustment from the temperature table may be added to an adjustment from the frequency table to yield an adjustment for the power ratio.

According to one embodiment to implement the tables, a power ratio is determined from the feedback information according to a diversity parameter technique. Adjustment data tables corresponding to the current operating conditions are used to determine an adjustment for the power ratio. The adjustment may be added to the power ratio to adjust the power ratio. A table for the power ratio value is used to establish modification parameter values that yield a desired phase difference value.

According to one embodiment, calibration data may be applied even if error is introduced into the calibrated diversity adjustment. According to the embodiment, the calibrated diversity adjustment for point N is $\Delta\Phi(N)$, and the calibrated diversity adjustment for point N+1 is $\Delta\Phi(N+1)$. An error $\delta\Phi$ is introduced into the calibrated diversity adjustment, so the actual diversity adjustment for a point N is $\Delta\Phi(N)+\delta\Phi(N)$, and the calibrated diversity adjustment for a point N+1 is $\Delta\Phi(N+1)+\delta\Phi(N+1)$. Accordingly, the calibrated diversity adjustment from point N to N+1 is $\Delta\Phi(N+1)-\Delta\Phi(N)$, and the actual diversity adjustment from point N to N+1 is $\Delta\Phi(N+1)-\Delta\Phi(N)+\delta\Phi(N,N+1)$. If the error is sufficiently small, then the calibration data may be applied.

Feedback communication device 20b includes a feedback generator 30 that generates feedback information that reflects the quality of the modified signals. The quality may be determined using any suitable measurements, for example, transmit gain, signal-to-noise ratio (SNR), bit error rate (BER), frame error rate (FER), other measurement, or any suitable combination of the preceding. Typically, a higher transmit gain, a higher signal-to-noise ratio, a lower bit error, or a lower frame error rate indicates higher signal quality. The feedback information may be sent to modifying communication device 20a in a quality indication signal.

A component of network 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to communication network 10 without departing from the scope of the invention. Additionally, operations of communication network 10 may be performed using any suitable logic. As used in this document, "each" refers to each member of a set or each member of a subset of a set. A subset of a set may include none, some, or all elements of the set.

FIG. 2 is a block diagram illustrating one embodiment of a system 50 that includes a calibrator 64 operable to perform a calibration process. According to the illustrated embodiment, calibrator 64 generates calibration data for communication device 62.

According to the illustrated embodiment, system 50 includes calibrator 64 coupled to communication device 62 by a communication bus 66. According to one embodiment, communication device 62 may comprise a transmit diversity device. Communication device 62 transmits signals through a plurality of channels 68. A channel may comprise a wireless radio frequency (RF) channel or a wired channel.

Calibrator 64 performs a calibration process to generate calibration data for communication device 62. The calibration process may be performed online in real time or offline in batch mode. Calibrator 64 may perform the calibration process according to any suitable method, for example, the method described with respect to FIG. 3. Communication bus 66 communicates information between calibrator 64 and communication device 62. Communication bus 66 may comprise any suitable communication link, for example, a general purpose interface bus (GPIB), universal serial bus (USB), Ethernet interface, or recommended standard 232C (RS 232) interface.

A component of system 50 may include logic, an interface, memory, other component, or any suitable combination of the preceding that may be integrated or separated according to particular needs. If any of the components of system 50 are separated, the separated components may be coupled using a bus or other suitable link.

Modifications, additions, or omissions may be made to system 50 without departing from the scope of the invention. The components of system 50 may be integrated or separated according to particular needs. Moreover, the operations of system 50 may be performed by more, fewer, or other modules. Additionally, operations of calibration system 50 may be performed using any suitable logic.

FIG. 3 is a flowchart illustrating one embodiment of a method for performing a calibration process that may be used by calibrator 64 of FIG. 2. Calibrator 64 performs the calibration process to generate calibration data for communication device 62.

The method starts at step 110, where calibrator 64 instructs communication device 62 to send signals. The instructions may specify, for example, diversity parameter values and modification parameter values. Calibrator 64 may send the instructions at the initial stages of the method or may send the instructions throughout the method. Moreover, calibrator 64 may adjust the instructions in accordance with signals sent by communication device 62.

Signals generated according to the instructions are received at step 114. Calibrator 64 performs various measurements of the signals to generate calibration data comprising calibration tables. Any suitable measurements may be performed, for example, measurements of absolute and relative signal features. According to one embodiment, a signal modifier may separately modify an I-channel signal according to a real weight and a Q-channel signal according to an imaginary weight. Signals from the channels are summed to yield a combined modified signal. According to the embodiment, the I-channel and Q-channel may be measured separately. The I-channel may be measured when there is no Q-channel output, and the Q-channel may be measured when there is no I-channel output. If there are $n_I$ I-values to be measured for the I-channel and $n_Q$ Q-values to be measured for the Q-channel, then $n_I + n_Q$ measurements may be taken. The vector output for a transmit control with I-value=k and Q-value=m may be estimated from the sum of the measured outputs I-value=k (with no Q-channel output) and Q-value=m (with no I-channel output).

Steps 118 through 130 describe the generation of tables that specify adjustments to account for power ratio changes in response to one or more operating conditions, for example, temperature and frequency. The power ratio is measured at a value of an operating condition at step 118. For example, the power ratio may be measured at a particular temperature value. If there is a next value of the operating condition at step 122, the method returns to step 118 to measure the power ratio at the next value. If there is no next value at step 122, the method proceeds to step 126.

Calibrator 64 establishes a table that specifies adjustments to account for power ratio changes in response to the operating condition at step 126. There may be a next operating condition, for example, frequency at step 130. If there is a next operating condition at step 130, the method returns to step 118 to measure the power ratio at a value of the next operating condition. If there is no next operating condition at step 130, the method proceeds to step 134.

Steps 134 through 146 describe the generation of tables that specify modification parameter values for different phase difference values, given particular power ratio values. Modification parameter values for a phase difference value, given a power ratio value, are established at step 134. The modification parameter values for a phase difference value may be established by determining the modification parameter values that yield the phase difference value. If there is a next phase difference value at step 138, the method returns to step 134 to establish the modification parameter values for the next phase difference value. If there is no next phase difference value at step 138, the method proceeds to step 142.

A table describing the modification parameter values for the phase difference values, given the power ratio value, is generated at step 142. If there is a next power ratio value at step 146, the method returns to step 134 to establish the modification parameter values for a phase difference value, given the next power ratio value. If there is no next power ratio value at step 146, the method proceeds to step 150.

Calibrator 64 provides results from the calibration process at step 150. Calibrator 64 may provide results to communication device 62 in real time or in batch mode.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a calibration process may be performed on a transmit diversity device to determine calibration data. The calibration data may be used to establish modification parameter values that yield specific diversity parameter values under actual operating conditions.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for calibrating a transmit diversity device, comprising:

establishing one or more diversity parameter values of one or more diversity parameters for a plurality of signals, each of the plurality of signals transmitted from a channel of a plurality of channels of said transmit diversity device by establishing at least one or more power ratio values of a power ratio;

performing the following for each of the one or more diversity parameter values to yield one or more associations:

determining based at least on said power ratio values one or more modification parameter values that yield a diversity parameter value, a modification parameter value of a modification parameter describing modulation of a feature of at least one signal of the plurality of signals; and associating the one or more modification parameter values with the diversity parameter value to yield an association for said diversity parameter value;

generating calibration data in accordance with the one or more associations; and calibrating said transmit diversity device using said calibration data.

2. The method of claim 1, wherein said determining one or more modification parameter values that yield said diversity parameter value further comprises:

measuring a relative feature of the plurality of signals, the relative feature describing a feature of a first signal of the plurality of signals with respect to the feature of a second signal of the plurality of signals.

3. The method of claim 1, wherein:
said determining one or more modification parameter values that yield a diversity parameter value further comprises:
measuring a variation of the power ratio value with respect to an operating condition; and
determining an adjustment in accordance with the variation.

4. The method of claim 3, wherein the operating condition comprises at least one of a temperature and a frequency.

5. The method of claim 1, wherein:
said establishing one or more diversity parameter values of one or more diversity parameters for a plurality of signals further comprises:
establishing one or more phase difference values of a phase difference; and
said determining one or more modification parameter values that yield a diversity parameter value further comprises:
determining a modification parameter value that yields a phase difference value.

6. The method of claim 1, wherein:
said determining one or more modification parameter values that yield a diversity parameter value further comprises:
determining a modification parameter value that yields a power ratio value.

7. The method of claim 1, wherein:
said establishing one or more diversity parameter values of one or more diversity parameters for a plurality of signals further comprises:
establishing one or more phase difference values, given a power ratio value; and
said determining one or more modification parameter values that yield a diversity parameter value further comprises:
determining a modification parameter value that yields a phase difference value, given the power ratio value.

8. The method of claim 1, further comprising:
providing the calibration data to the transmit diversity device in real time.

9. The method of claim 1, further comprising:
providing the calibration data to the transmit diversity device as a batch file.

10. A calibrator for calibrating a transmit diversity device, comprising:
an interface operable to:
receive a plurality of signals, each of the plurality of signals transmitted from a channel of a plurality of channels of a transmit diversity device; and
a processor coupled to the interface and operable to:
establish one or more diversity parameter values of one or more diversity parameters for the plurality of signals at least by establishing one or more power ratio values of a power ratio;
perform the following for each of the one or more diversity parameter values to yield one or more associations:
determine based at least on said power ratio values one or more modification parameter values that yield a diversity parameter value, a modification parameter value of a modification parameter describing modulation of a feature of at least one signal of the plurality of signals; and
associate the one or more modification parameter values with the diversity parameter value to yield an association; and
generate calibration data in accordance with the one or more associations.

11. The calibrator of claim 10, the processor further operable to determine one or more modification parameter values that yield a diversity parameter value by:
measuring a relative feature of the plurality of signals, the relative feature describing a feature of a first signal of the plurality of signals with respect to the feature of a second signal of the plurality of signals.

12. The calibrator of claim 10, the processor further operable to:
determine one or more modification parameter values that yield a diversity parameter value by:
measuring a variation of the power ratio value with respect to an operating condition; and
determining an adjustment in accordance with the variation.

13. The calibrator of claim 12, wherein the operating condition comprises at least one of a temperature and a frequency.

14. The calibrator of claim 10, the processor further operable to:
establish one or more diversity parameter values of one or more diversity parameters for a plurality of signals by:
establishing one or more phase difference values of a phase difference; and
determine one or more modification parameter values that yield a diversity parameter value by:
determining a modification parameter value that yields a phase difference value.

15. The calibrator of claim 10, the processor further operable to:
determine one or more modification parameter values that yield a diversity parameter value by:
determining a modification parameter value that yields a power ratio value.

16. The calibrator of claim 10, the processor further operable to:
establish one or more diversity parameter values of one or more diversity parameters for a plurality of signals by:
establishing one or more phase difference values, given a power ratio value; and
determine one or more modification parameter values that yield a diversity parameter value by:
determining a modification parameter value that yields a phase difference value, given the power ratio value.

17. The calibrator of claim 10, the processor further operable to:
provide the calibration data to the transmit diversity device in real time.

18. The calibrator of claim 10, the processor further operable to:
provide the calibration data to the transmit diversity device as a batch file.

* * * * *